United States Patent
Nicosevici

(10) Patent No.: US 12,511,882 B2
(45) Date of Patent: Dec. 30, 2025

(54) CONTINUOUSLY, ADAPTIVE DETECTION COMPUTER-IMPLEMENTED METHOD OF ENVIRONMENT FEATURES IN AUTONOMOUS AND ASSISTED DRIVING OF AN EGO-VEHICLE

(71) Applicant: Continental Autonomous Mobility Germany GmbH, Ingolstadt (DE)

(72) Inventor: Tudor Nicosevici, Timisoara (RO)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 386 days.

(21) Appl. No.: 18/246,504

(22) PCT Filed: Sep. 21, 2021

(86) PCT No.: PCT/EP2021/075936
§ 371 (c)(1),
(2) Date: Mar. 23, 2023

(87) PCT Pub. No.: WO2022/063774
PCT Pub. Date: Mar. 31, 2022

(65) Prior Publication Data
US 2023/0368506 A1    Nov. 16, 2023

(30) Foreign Application Priority Data
Sep. 23, 2020   (EP) ..................... 20465562

(51) Int. Cl.
*G06V 10/774*   (2022.01)
*G06T 9/00*   (2006.01)
(Continued)

(52) U.S. Cl.
CPC .......... *G06V 10/7747* (2022.01); *G06T 9/002* (2013.01); *G06V 10/761* (2022.01);
(Continued)

(58) Field of Classification Search
CPC .. G06V 10/7747; G06V 20/58; G06V 10/761; G06V 10/82; G06V 10/95; G06V 10/776; G06T 9/002
See application file for complete search history.

(56) References Cited

U.S. PATENT DOCUMENTS

| 11,662,735 B2 | 5/2023 | Huger |
| 2018/0068206 A1 | 3/2018 | Pollach |

(Continued)

FOREIGN PATENT DOCUMENTS

| CN | 111290381 A | 6/2020 |
| DE | 10 2009 039 568 A1 | 5/2010 |

(Continued)

OTHER PUBLICATIONS

Great Britain Office Action dated Mar. 9, 2021, for counterpart GB Application No. 2015079.3.

(Continued)

*Primary Examiner* — Matthew C Bella
*Assistant Examiner* — Jinsu Hwang
(74) *Attorney, Agent, or Firm* — Buchanan Ingersoll & Rooney PC

(57) ABSTRACT

A method of continuously, adaptive detection of environment features in autonomous and assisted driving of an ego-vehicle connected to a server and to a plurality of other vehicles. The method includes data collection by the ego-vehicle in which, based on the machine learning model of the ego-vehicle, the acquired sensor data—among which images, generate a specific scenario interpretation. When feedback is received that the scenario interpretation is wrong, the corresponding images of the ego-vehicle are encoded, hashed and sent to a server with the request to broadcast them to the plurality of other vehicles requesting the other vehicles to communicate the server specific similar (Continued)

EGO vehicle V1 scenario interpretations. Then, the other vehicles identify the specific combination of environment features corresponding to the wrong scenario interpretation, acquire their own sensor data and process same, including images that are extracted, encoded and hashed.

14 Claims, 3 Drawing Sheets

(51) Int. Cl.
    *G06V 10/74* (2022.01)
    *G06V 10/776* (2022.01)
    *G06V 10/82* (2022.01)
    *G06V 10/94* (2022.01)
    *G06V 20/58* (2022.01)

(52) U.S. Cl.
    CPC ............ *G06V 10/776* (2022.01); *G06V 10/82* (2022.01); *G06V 10/95* (2022.01); *G06V 20/58* (2022.01)

(56) References Cited

U.S. PATENT DOCUMENTS

| | | |
|---|---|---|
| 2018/0349785 A1 | 12/2018 | Zheng |
| 2019/0205765 A1 | 7/2019 | Mondello |
| 2019/0225234 A1 | 7/2019 | Kumar et al. |
| 2019/0226851 A1 | 7/2019 | Nicosevici |
| 2020/0017117 A1* | 1/2020 | Milton ................. G08G 1/0112 |
| 2020/0074230 A1 | 3/2020 | Englard et al. |
| 2020/0074862 A1* | 3/2020 | Johnston ................. G08G 1/22 |
| 2020/0241543 A1 | 7/2020 | Huger |

FOREIGN PATENT DOCUMENTS

| | | |
|---|---|---|
| JP | 2019008796 A | 1/2019 |
| JP | 2019021201 A | 2/2019 |
| JP | 7035204 B2 | 3/2022 |
| WO | 2020049685 A1 | 3/2020 |
| WO | 2020231153 A1 | 11/2020 |

OTHER PUBLICATIONS

The International Search Report and the Written Opinion of the International Searching Authority mailed on Jan. 25, 2022 for the counterpart PCT Application No. PCT/EP2021/075936.
BSI group.com CAV Vocabulary (BSI Flex 1980 v3.0), Advanced driver assistance system (ADAS) Version 3.0; Release date Oct. 2020, https://www.bsigroup.com/en-GB/CAV/cav-vocabulary/advanced-driver-assistance-system/.
BSI group.com, CAV Vocabulary (BSI Flex 1980 v3.0), Ego vehicle; Version: 3.0, Release date: Oct. 2020, https://www.bsigroup.com/en-GB/CAV/cav-vocabulary/ego-vehicle/.
Jan-Aike Bolte et al, Towards corner case Detection for autonomous Driving, Cornell University Library, 201 Olin Library Cornell University, Ithica NY, Feb. 25, 2019 (Feb. 25, 2019) | xP081032970.
Notice of Reasons for Refusal drafted Feb. 9, 2024 for the counterpart Japanese Patent Application No. 2023-517795 and machine translation of same.
Decision to Grant a Patent drafted May 23, 2024 for the counterpart Japanese Patent Application No. 2023-517795 and machine translation of same.
Elbir et al., "Federated Learning for Vehicular Networks", 2022 IEEE International Mediterranean Conference on Communications and Networking (MeditCom), Athens, Greece, (Jun. 2022), pp. 72-77.
Tian et al., "DeepTest: Automated Testing of Deep-Neural-Network-driven Autonomous Cars", 2018 IEEE/ACM 40th International Conference on Software Engineering (ICSE), (May 2018), pp. 303-314.
Zhang et al., "End-to-End Federated Learning for Autonomous Driving Vehicles" 2021 International Joint Conference on Neural Networks (IJCNN), Shenzhen, China, (Jul. 2021), pp. 1-8.
Office Action (Communication pursuant to Article 94(3) EPC) issued May 8, 2025, by the European Patent Office in corresponding European Patent Application No. 21 783 423.3-1218. (6 pages).
Office Action (Notice of Grounds for Rejection) issued May 7, 2025, by the Korean Intellectual Property Office in corresponding Korean Patent Application No. 10-2023-7009084 and an English translation of the Office Action. (6 pages).
Office Action (Request for the Submission of an Opinion) issued Aug. 28, 2025, by the Korean Intellectual Property Office in corresponding Korean Patent Application No. 10-2023-7009084 and an English translation of the Office Action. (6 pages).
Office Action (The First Office Action) issued Sep. 23, 2025, by the State Intellectual Property Office of People's Republic of China in corresponding Chinese Patent Application No. 202180064071.6 and an English translation of the Office Action. (10 pages).

\* cited by examiner

Other vehicles Vi

CONTINUOUSLY, ADAPTIVE DETECTION COMPUTER-IMPLEMENTED METHOD OF ENVIRONMENT FEATURES IN AUTONOMOUS AND ASSISTED DRIVING OF AN EGO-VEHICLE

CROSS-REFERENCE TO RELATED APPLICATIONS

The present application is a National Stage Application under 35 U.S.C. § 371 of International Patent Application No. PCT/EP2021/075936 filed on Sep. 21, 2021, and claims priority from European Patent Application No. 20465562.5 filed on Sep. 23, 2020, in the European Patent Office, the disclosures of which are herein incorporated by reference in their entireties.

TECHNICAL FIELD

The present invention relates to a continuously and adaptive computer-implemented method used for detection of environment features in autonomous and assisted driving of an ego-vehicle, the method including the use of a machine training model; to a trained machine learning model, to a system to carry out the method and to a plurality of non-transitory computer-readable mediums.

BACKGROUND

With increasingly autonomous and intelligent transportation, the need of systems that enable the vehicles to understand better, more robustly and more comprehensively their surroundings are required. A cornerstone of such systems is represented by advanced driving assistance (ADAS) sensors, that can reliably detect, measure and classify certain features in the vehicle's environment (e.g. road elements, etc.).

The advanced driving assistance sensors of the vehicles acquire various type of data, among which images, that are used for the advanced driving assistance functions of the vehicle.

In this context, the latest developments in both hardware and software have led to wide deployment of artificial intelligence, namely machine learning technologies in advanced driving assistance sensor functions.

The training of the machine learning models used in advanced driving assistance sensor functions is usually based on creating a plurality of scenarios with the help of the machine learning models.

Each specific scenario from the plurality of scenarios concerns a specific combination of environment features. Unlimited examples of scenarios: a straight highway with trees, a straight highway without trees, the entry in a tunnel, the exit from a tunnel, the inside of a tunnel when the road is straight, a parking, a curve without change of altitude, a curve with change of altitude, etc. By use of the machine learning models, it is expected that the vehicles be able to identify based on a limited number of scenarios corresponding to the training data, combinations of environment features that are similar to the combinations from the scenarios.

The output data of the machine learning models is the interpretation of the data acquired from the servers generating scenario interpretations.

Then, each scenario has associated instructions for the ego-vehicle with the purpose of taking a certain action for the safety of the driving. The instructions generally include messages to the driver when the vehicle is manned or to driving instructions when the vehicle is autonomous. The instructions exceed the scope of this disclosure.

While very powerful, one of the main challenges associated with machine learning models is their training. During training, sets of examples are provided to the machine learning models, allowing them to automatically learn certain particularities (such as texture, shapes, colours etc.) of the features they are intended to extract. The most crucial aspect is that sufficient examples with high variability need to be provided during training in order for the machine learning model to truly "understand" what is relevant and discriminative about a certain feature (e.g. shape and wheels in a vehicle, the silhouette of a pedestrian etc.). If the training is not properly done, with enough, diverse examples, the machine learning model will extract irrelevant attributes for objects and phenomenon that fit the provided examples, but do not generalize well. This is called overfitting, and is this single most significant shortcoming, affecting the quality and robustness of machine learning model.

In case of detection, classification, segmentation and localization applications, the training of machine learning models required manually labelled data, leading to huge human efforts in providing sufficient training examples. This is especially the case for deep neural networks, where complex, powerful architectures require hundreds of thousand or even millions of parameters to be trained. In order to train such networks, tens of thousands of training examples are required in order to avoid overfitting and to build a powerful machine learning model. This is impractical due to the limited availability of data and human effort required for labelling.

A much more efficient solution is to detect situations where the machine learning model is likely to fail, such as false positives and negatives, wrong classifications, resulting in wrong interpretation of the scenario, etc., and perform additional training using these samples or similar cases, usually called corner cases. This greatly improves the precision of the machine learning models using relatively small amounts of additional data.

As mentioned before, it is important to obtain such corner cases, where the machine learning models are likely to fail, and feed them back into the retraining of the machine learning model, greatly improving their performance. Such cases are not only determined by limitations in trained models, but also, perhaps more often, by environmental conditions. Here are a few examples:

challenging lighting situations, such as those found in tunnels, indoor parking, etc., can decrease the precision of camera-based machine learning models, in charge of detection and classification of lane markers, traffic signs, traffic lights etc.;

bridges, guard-rails, and other metallic structures can influence negatively the performance of radar-based machine learning models, in detecting and localizing traffic participants, and static environment elements; and moreover, complex scenarios, such as intersections and roundabouts, can prove challenging to machine learning models.

Currently, the retraining of the machine learning models is made incrementally at the level of the ego-vehicle. The correction of the scenario is carried out manually by an operator from a server having the processing capabilities to do so, and then the correct data is sent to the ego-vehicle and used to retrain the respective machine learning model of the ego-vehicle.

The disadvantages of this approach are as follows:
the improvement of the respective machine learning model of the ego-vehicle following the retraining using a single example is marginal;
since the correction is carried out manually, this requires additional time, thus the improvement is slow; and
in some cases, when operator from a server has no information available to make the correction, he has to carry out other actions in order to find such information which entail additional costs.

SUMMARY

For these reasons, the technical problem to be addressed is not only to detect situations where such machine learning models fail, but also to be able to extract sensors data corresponding to similar scenarios where the machine learning model has failed, sensors data that can be later analysed and used as additional training data for the machine learning model of the ego-vehicle.

Therefore, the object of the present disclosure is to address the deficiencies of the prior art and to provide a continuously adaptive method of detection of the environment features in autonomous and assisted driving of the ego-vehicle such that, when such a corner case is detected by the ego-vehicle, to allow automatic retrieval of similar cases from other vehicles in order to detect the correct scenario and in order to update the machine learning model of the ego-vehicle.

The expressions "retrain the machine learning model" and "update the machine learning model" are used interchangeably in this disclosure.

The subject-matter of the present disclosure is, in a first aspect, a continuously adaptive detection computer-implemented method of environment features in autonomous and assisted driving of an ego-vehicle, the ego-vehicle connected to a server, the server connected to a plurality of other vehicles, the ego-vehicle, the other vehicles and the server being provided with a machine learning model.

The method includes:
a data collection step I, carried out by a data collection and processing unit of the ego-vehicle:
  acquiring by ADAS sensors of the ego-vehicle sensors data from the surroundings of ego-vehicle referring to said environment features;
  interpreting the sensors data based on the machine learning model generating a specific scenario interpretation;
  sending associated instructions to an execution electronic control unit of the ego-vehicle according to the specific scenario interpretation;
  receiving feedback from the execution electronic control unit if the specific scenario interpretation is wrong, leading to a wrongly-interpreted specific scenario,
  extracting camera images from the acquired sensors data corresponding to the wrong specific scenario interpretation;
  encoding and hashing the camera images corresponding to the wrongly-interpreted specific scenario and obtaining ego-vehicle image hashes; and
  sending the ego-vehicle image hashes corresponding to the wrongly-interpreted specific scenario to the server together with the acquired sensors data and a request for identifying by the other vehicles of specific similar scenarios by the vehicles;
a data processing step II, carried out by the server:
  identifying the specific combination of the environment features corresponding to the wrong specific scenario interpretation by the ego-vehicle;
  broadcasting the ego-vehicle image hashes to the plurality of other vehicles together with a server request that each of the plurality of other vehicles communicates to the server:
  specific similar scenarios by the vehicles according to the data image hashes received from the ego-vehicle, and
  other vehicles associated acquired sensors data respective to the other vehicles in similar scenarios;
a data processing step III, carried out the other vehicles' respective data collection and processing unit:
  receiving the broadcasted ego-vehicle image hashes and the server request from the server;
  acquiring by ADAS sensors of each of the other vehicles sensors data from the surroundings of the each other vehicle according to the server request,
  processing the acquired sensors data by the other vehicles including, extracting, encoding and hashing other vehicles camera images from the acquired sensors data, obtaining respective other vehicles image hashes,
  comparing similarity between the image hashes received from the ego-vehicle and the respective other vehicles by means of a similarity score surpassing a given threshold, meaning that a high similarity score corresponds to similar images, in terms of structure and content, and
  based on the similarity score,
    retrieving the acquired sensors data and the specific similar scenarios by said vehicles corresponding to the image hashes for which the similarity score surpasses the given threshold,
    sending to the server:
      the specific similar scenarios by said vehicles according to the data image hashes received from the ego-vehicle,
      and
      other vehicles associated acquired sensors data respective to the other vehicles similar scenario; and
a data processing step IV, carried out by carried out by the server:
  comparing:
    the ego-vehicle sensors data corresponding to the wrongly-interpreted specific scenario with
    the other vehicles associated acquired sensors data respective to the similar scenarios;
  aggregating the acquired sensors data received from the ego-vehicle and the other vehicles, and using the aggregated sensors data for the incremental retraining of the machine learning model, and
  sending to the ego-vehicle the incrementally-retrained model.

In a second aspect of the present disclosure, it is presented a training method for continuously adaptive detection of environment features in autonomous and assisted driving of an ego-vehicle carried out by a server in accordance to step 4 of any of the embodiments based on additional training data wherein the additional training data is the respective other vehicles associated acquired sensors data corresponding to the wrong scenario interpretation of ego-vehicle.

In a third aspect of the present disclosure, it is presented a trained machine learning model, trained in accordance with the method of any of the embodiments.

In a fourth aspect of the invention, it is presented a data-processing system including:
- an ego-vehicle,
- a server,
- a plurality of other vehicles, and
- a telecommunication network connecting the ego-vehicle and each of other vehicles to the server, wherein the system includes means configured to carry out the steps of the method of any of the embodiments.

Finally, in a fifth aspect of the present disclosure, it is presented a plurality of non-transitory computer-readable mediums storing instructions that, when executed by one or more respective processors of the server, of the ego-vehicle and of the other vehicles causes the respective one or more server processors to perform the method of any of the embodiments.

Further advantageous embodiments are the subject matter of the dependent claims.

The main advantages of using the method according to the present disclosure are as follows:
- the degree of improvement of the respective machine learning model of the ego-vehicle by retraining is higher than in the state of art because there are sensors data, including subsets of images collected by multiple vehicles that encountered similar scenarios, leading to a much higher degree of variability in the training data;
- the time of the improvement is considerably shortened because, of the automation of data acquisition process on one hand and because of the time saving;
- financial resources are saved, because there is no need to carry out any other actions to obtain information to retrain the model other than the actions described in the method of the present disclosure;
- the additional computing resources of the server are allocated in an efficient manner and the precision of the machine learning models is greatly improved using relatively small amounts of additional data; and
- such method advantageously allows continuous improvement of machine learning-based detection and classification for traffic participants and static environment elements such as: lanes, traffic signs, traffic lights, road markings.

Further special features and advantages of the present disclosure can be taken from the following description and the accompanying drawings.

DETAILED DESCRIPTION

Figure 1:
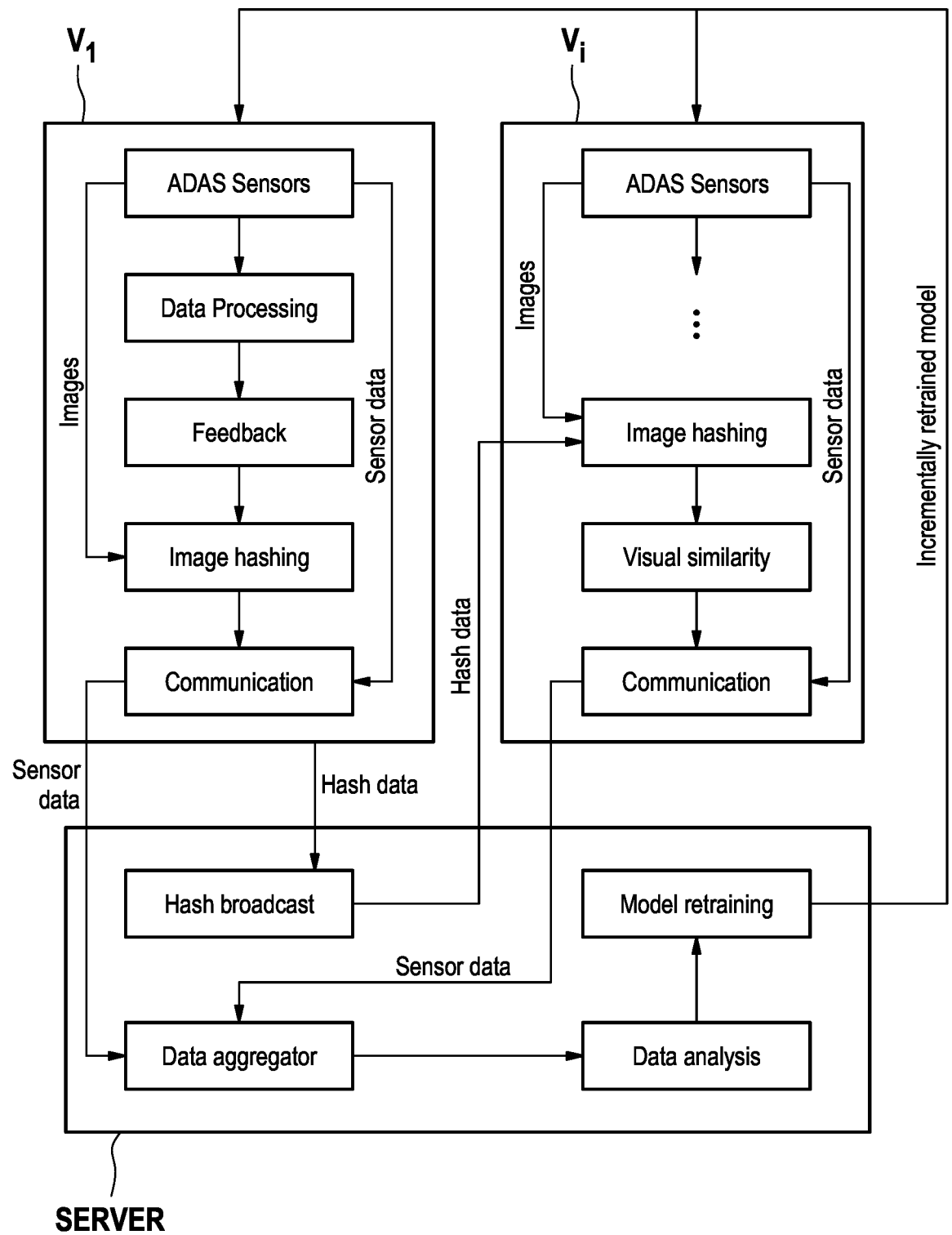
FIG. 1 is a schematic block diagram of a method according to the present disclosure.

Referring now to FIG. 1, it is illustrated an exemplary embodiment of the present disclosure.

The method of the invention is carried out in a system comprising:
- an ego-vehicle V1,
- a server,
- a plurality of other vehicles Vi, where i=2, ... n, and
- a telecommunication network connecting the ego-vehicle V1 and each of other vehicles V1 to the server.

The ego-vehicle V1, the other vehicles Vi are provided with advanced driving assistance (ADAS) sensors. The server can be a single-piece hardware server or a multi-piece hardware server either placed in physical proximity or communicating within the telecommunication network. The configuration of the server is according to prior art.

The ego-vehicle V1, the other vehicles Vi and the server are provided with the same machine learning model. It shall be understood that, if the specialist in the art considers that minor adaptations of the machine learning model to each of the vehicles and/or to the server are needed, then such minor adaptations shall fall within the scope of "the same machine learning model".

Figure 2A:
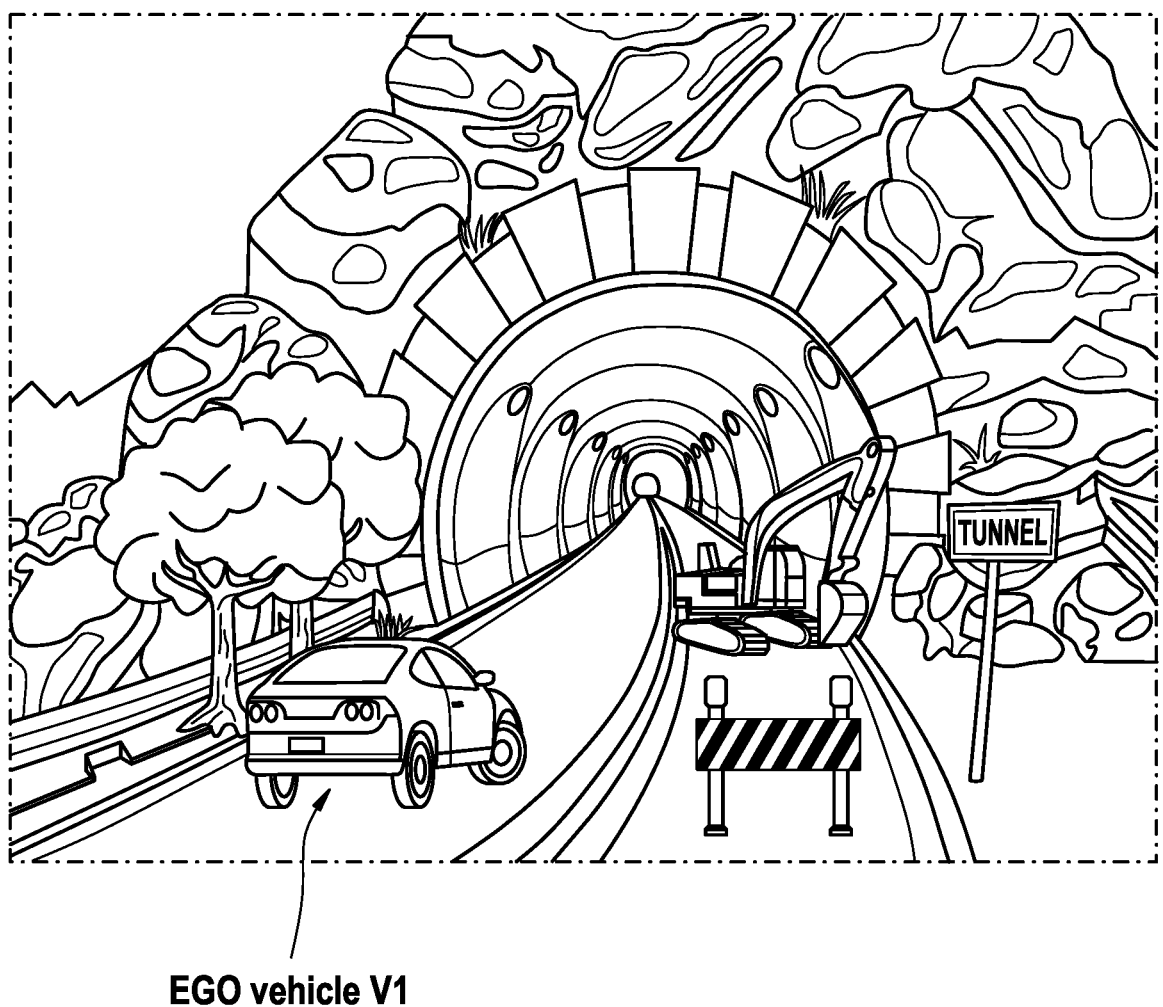
FIG. 2a is a schematic representation of the scenario in which ego-vehicle encountered a situation where there was a corner case.
Figure 2B:
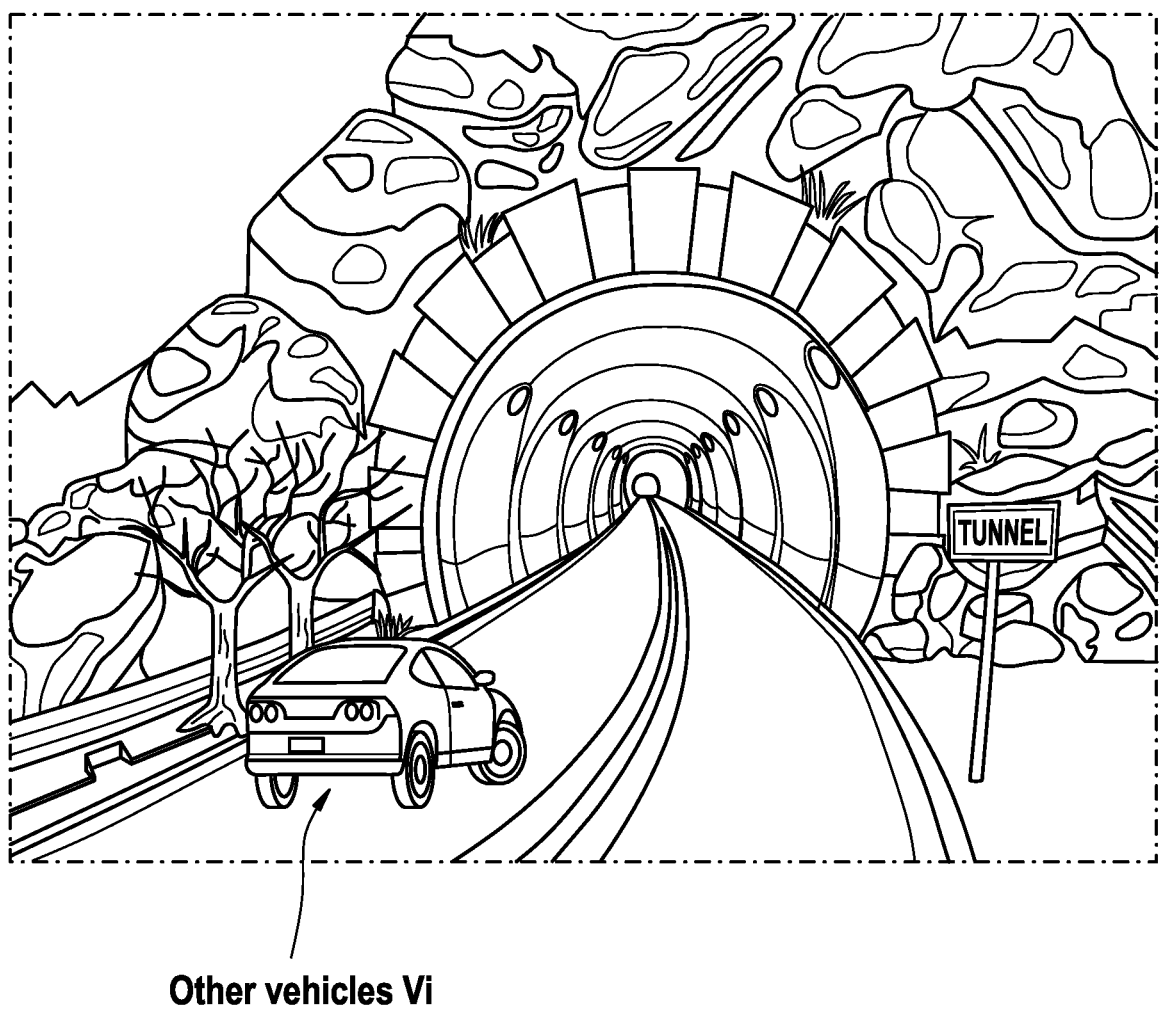
FIG. 2b is a schematic representation of a similar scenario with the one of FIG. 2a identified by one of the other vehicles.

To ease the understanding of the present disclosure, a concrete example is considered with reference to FIGS. 2a and 2b. In a real-world scenario of FIG. 2a there is an entry to the tunnel. Due to nature of radar sensors, for example, the perception system of ego-vehicle V1, might interpret the presence of another vehicle on the ego-lane due to radar reflections from the walls of the tunnel, resulting in an unwanted maneuver, such as sudden lane change. The driver of ego-vehicle V1 will correct the actions of the automated driving system.

FIG. 2b represents a similar scenario to that encountered by ego-vehicle V1, detectable by other vehicles by means of the presented disclosure, in spite of irrelevant differences— the presence of a bob-cat, vegetation, etc.

The real-world scenery is considered dynamically, that is they change continuously as the vehicles change their position when running. FIG. 2a illustrates the situation at a certain moment in time for the purpose of exemplification. Based on this reality, it is needed to provide a method of detecting the environment features that are continuously adaptive, which in turn requires that the scenarios be continuously adaptive and enriched. The adaptivity of the scenarios is carried out by use of the machine learning model on the server, on the ego-vehicle V1 and on the other vehicles Vi.

The method according to the disclosure has five steps.

The first step of the method is a data collection step I, carried out by a data collection and processing unit of the ego-vehicle V1.

The ego-vehicle V1 uses ADAS sensors data, by ADAS sensors including at least a camera, lidar, radar etc. ADAS sensor data includes but is not limited to camera images acquired by a forward-looking camera, a surround view camera system, etc., to capture the environment features of the surroundings of the ego-vehicle V1.

Such sensors data is processed based on the machine learning model of the ego-vehicle V1 and is able to detect and classify the environment features such as traffic participants and environmental features, i.e., lanes, traffic signs, traffic lights, road markings, etc.

By using the machine learning model, the data collection and processing unit of the ego-vehicle V1 interprets the sensors data generating a specific scenario interpretation.

In the example from FIGS. 2a and 2b, the data collection and processing unit of the ego-vehicle V1 is expected to interpret, by use of the machine learning model, the sensors data acquired from the scenery of FIG. 2a according to the scenario shown in FIG. 2b and then to send the associated instructions to the execution control unit of the ego-vehicle V1 according to the specific scenario interpretation.

The associated instructions correspond to specific expected behavior from the ego-vehicle V1.

Examples of associated instructions include to slow down and turn on the lights correspond to the specific expected behavior of slowing down and respectively turning on the lights.

The sanity of sensor data processing (detection, classification, etc.) is continuously monitored and validated by means of computing a confidence, plausibility score, or by systems disengagements due to driver intervention. The validation as such—which is carried out by interpreting the actions of the driver, is not the object of the present disclosure.

When the execution control unit detects a corner case, namely any data inconsistency such as a failure in machine learning, coherence checks, high uncertainties, disengagements from the driver, etc., the execution control unit sends feedback to the data collection and processing unit of the ego-vehicle V1 that the specific scenario interpretation is wrong, which means that there is a wrongly-interpreted specific scenario.

Whenever discrepancies occur between the expected behavior and the actual behavior of the ego-vehicle V1, the feedback is sent to the data collection and processing unit of the ego-vehicle V1.

After receiving the feedback, the data collection and processing unit of the ego-vehicle V1 extracts camera images from the sensors data, such as images from the forward-looking cameras, the camera images corresponding to the wrongly-interpreted specific scenario.

The extracted images are then encoded and hashed. The corresponding ego-vehicle V1 image hashes are sent to the server, accompanied by the acquired sensors data corresponding to the wrong specific scenario interpretation and by a request made by the data collection and processing unit of the ego-vehicle V1 to the server for identifying by the other vehicles Vi of specific similar scenarios by each of the other vehicles Vi.

Taking the example from the FIGS. 2a and 2b, the extracted images from FIG. 2a are encoded, hashed and sent to the server together with all the other sensors data corresponding to them. The request to the server in this case is to "ask" the other vehicles Vi to identify the specific similar scenarios matching the extracted images from FIG. 2a.

Each of the other vehicles Vi is provided with a respective data collection and processing unit similar to the data collection and processing unit of the ego-vehicle V1. The similarity between the data collection and processing units is considered if the functions of the respective data collection and processing units are carried out identically.

In the data processing step II, carried out by carried out by the server, it is first identified the specific combination of the environment features corresponding to the wrongly-interpreted specific scenario by the ego-vehicle V1. Then, the server broadcasts the image hashes received from the ego-vehicle V1 together with a server request that each of the plurality of other vehicles Vi communicates to the server:
   specific similar scenarios by the vehicles Vi according to the data image hashes received from the ego-vehicle V1, and
   other vehicles Vi associated acquired sensors data respective to the other vehicles Vi in similar scenarios.

In the example of FIG. 2a, the server request refers to the fact that there is a problem with the identification of the entry in the tunnel—the specific scenario—and that the other vehicles Vi must send over sensors data referring to the entry in the tunnel with similar characteristics—other vehicles Vi image hashes, together with all the acquired sensors data corresponding to the other vehicles Vi image hashes—and the tunnel entries with similar environment features: entry into a tunnel with similar characteristics of that encountered by the ego-vehicle V1.

The data processing step III is carried out by the other vehicles Vi's respective data collection and processing unit.

First, each of the other vehicles Vi's data collection and processing unit receives from the server the broadcasted ego-vehicle V1 hashed images and the server request.

Then, the ADAS sensors of each of the other vehicles Vi acquire sensors data from the surroundings of the each other vehicle Vi, referring to the specific combination of the environment features according to the server's request. In the example, sensors data of the other vehicles Vi acquire information about the entry into tunnels with similar characteristics with the ones of the request from the server. The duration of this step is pre-set, for example, to one day or one week, depending on the number of other vehicles available, on the content of the scenery, etc.

Then, the other vehicles Vi's respective data collection and processing units process in real time the acquired sensors data, with the processing include extracting camera images from the sensors data, hashing of the extracted images and obtaining respective other vehicles Vi image hashes.

Then, the other vehicles Vi's respective data collection and processing units compare the similarity between the image hashes received from the ego-vehicle V1 and its own respective image hashes by means of a similarity score surpassing a given threshold, meaning that a high similarity score corresponds to similar scenarios, in terms of structure and content.

Although the broadcast from the server is received by each of the other vehicles Vi, it may be possible that not all the other vehicles Vi from the plurality of other vehicles Vi be able to acquire images from their respective surroundings according to the server request, for example because some of the other vehicles Vi from the plurality of other vehicles Vi are running in areas where there are no such similar surroundings, e.g., no tunnels. Instead, each of the other vehicles Vi that has acquired images from their respective surroundings will output respective image hashes and will apply the similarity score to the comparison between its own image hashes and the image hashes received from the ego-vehicle V1.

Then, based on the similarity score, the other vehicles Vi's respective data collection and processing units retrieve the acquired sensors data and the specific similar scenarios by the vehicles Vi corresponding to the image hashes for which the similarity score surpasses the given threshold.

The method works if at least one of the other vehicles Vi is able to send to the server the acquired sensors data as mentioned above.

At the end of step III, the other vehicles Vi's respective data collection and processing units send to the server:
   the specific similar scenarios by said vehicles Vi according to the data image hashes received from the ego-vehicle V1,
   the other vehicles Vi associated acquired sensors data respective to the similar scenarios.

The data processing step IV is carried out by the server.
In this step the server compares:
   the ego-vehicle V1 sensors data corresponding to the V1 wrongly-interpreted scenario, with
   the other vehicles Vi associated acquired sensors data respective to the similar scenarios.

Given the definition of the similarity score, and the fact that the machine learning model of the other vehicles Vi is the same, it is reasonable to expect that the specific similar scenarios by the large majority of the other vehicles Vi in the preceding step is the same. In the example, this corresponds to the image depicted in FIG. 2b.

Once the server has received the sensors data acquired by the ego vehicle V1 and by the other vehicles Vi, the server aggregates the acquired sensors data received from the other vehicles Vi and from the ego-vehicle V1. This is carried out using the server's machine learning model.

This is the reason why the server requested in step II that the other vehicles Vi send associated acquired sensors data respective to the other vehicles Vi image hashes. In fact, the other vehicle V1 data hashes are used to identify the corner cases, whereas the sensors data for the corner cases are used for the aggregation for the purpose of the incremental retraining of the machine learning model, since the sensors data provide more information about the environmental features than the images alone.

The aggregation of the acquired sensors data is carried out using techniques of aggregation suitable for sensors data.

Then, the aggregated sensors data is used by the server for the incremental retraining of the machine learning model.

At the end of step IV, the server sends to the ego-vehicle V1 the incrementally retrained model.

The sending of the incrementally retrained machine learning model by the server is carried out in the usual way for sending updates to the ego-vehicle V1, such as but not limited to over-the-air updates.

Then, in the data processing step V, carried out by the data collection and processing unit of the ego-vehicle V1, the machine learning model on the ego-vehicle V1 is updated by replacing the existing machine learning model with the incrementally retrained machine learning model received from the server.

Taking again the example, by retraining the machine learning model of the ego-vehicle V1, if confronted again with the scenery of FIG. 2a, the data collection and processing unit of the ego-vehicle V1 will correctly interpret the acquired images according to the specific scenario of FIG. 2b, the specific scenario being now enriched with these new environment features.

In an embodiment, the retraining of the machine learning model as carried out by the server is sent to the plurality of other vehicles Vi for updating each of the respective machine learning model on the other vehicles Vi.

The sending of the incrementally retrained machine learning model by the server is carried out in the usual way for sending updates to the plurality of other vehicles Vi, such as but not limited to over-the-air updates.

This has the advantage that each of the vehicles Vi can play the role of the ego-vehicle V1 at a certain moment in time and that all the other vehicles Vi can take advantage of the incrementally retrained machine learning model of the ego-vehicle V1.

In another embodiment, an example of machine learning model used for detection and classification of environment features is a Convolutional Neural Network (CNN).

In another embodiment, the image encoding and hashing is done by means of visual bag-of-words (BoW) representation. According to this technique, visual information is obtained from raw images by extracting image features. Image features correspond to regions of an image with high discriminative value, making them representative for the image content. Image features are then represented using feature descriptors, which describe the corresponding regions in a compact form, typically taking into account the gradient distribution within the regions. Classical approaches use Scale-invariant Feature Transformation (SIFT) and Speeded-Up Robust Features (SURF) techniques for feature extraction and description.

The use of visual BoW representation for the image encoding and hashing is advantageous because this technique enhances the object categorization for the objects of the real-world scenery.

In another embodiment using the visual BoW representation, binary techniques are used. Non-limiting examples of binary techniques are: Binary Robust Independent Elementary Features (BRIEF) or Oriented and Rotated Binary Robust Independent Elementary Features (ORB), resulting in a more compact representation, decreasing the computational costs associated with the processing, storage and transmission of image features.

The advantage of using binary techniques is that they are efficient feature point description which leads to enhancing the capability to describe the essence of the real-world scenery of the image hashes.

Visual BoW processing techniques generally include three stages:
1. Training stage: in this stage, the image features are extracted from a series of training images. Visually similar image features are then grouped together, obtaining a so-called visual vocabulary, which represents a set of generalized image features, called visual words. The feature grouping is carried out using clustering techniques, such as k-means and agglomerative;
2. Hashing (indexing) stage: this enables compact representation of the images. In here, features are extracted from images. The features are then associated with words in vocabulary generated during the training stage, using visual similarity criteria. The result is a histogram of visual word occurrence frequency for the given image, which represents the image hash;
3. Visual similarity computation: in order to calculate the visual similarity between two images, either the Euclidean distance or cosine similarity of their hashes is computed.

In a second aspect of the present disclosure, it is presented a training method for continuously adaptive detection of environment features in autonomous and assisted driving of an ego-vehicle carried out by a server in accordance with step IV of any of the embodiments based on additional training data wherein the additional training data is the respective other vehicles Vi associated acquired sensors data corresponding to the wrong scenario interpretation of ego-vehicle V1.

The machine learning model is already trained by the server before the initiation of the method of the present disclosure using initial training data. The present disclosure deals with the continuously adaptive detection of the environment features that includes the updating of the machine learning method. The present disclosure does not deal with the initial training of the machine learning model before the initiation of the method. This is why the training method of the present disclosure uses the additional training data as received from the respective other vehicles Vi.

In a third aspect of the present disclosure, it is presented a trained machine learning model, trained in accordance with the method of any of the embodiments.

The trained machine learning model of the third aspect results from each update of the machine learning method, the update being the result of the method of the present disclosure in any of the embodiments.

In a fourth aspect of the present disclosure, it is presented a data-processing system including:

an ego-vehicle V1,
a server,
a plurality of other vehicles Vi, and
a telecommunication network connecting the ego-vehicle and each of other vehicles to the server. The system of the present disclosure includes means configured to carry out the steps of the method of any of the embodiments, as disclosed above in the section referring to the method.

Finally, in a fifth aspect of the present disclosure, it is presented a plurality of non-transitory computer-readable mediums storing instructions that, when executed by one or more respective processors of the server, of the ego-vehicle and of the other vehicles causes the respective one or more server processors to perform the method of any of the embodiments.

As the method of the present disclosure is carried out in a distributed system, each of the system elements, namely the server, the ego vehicle V1 and each of other vehicles Vi has its respective non-transitory computer-readable mediums storing instructions and has one or more processors. According to the steps of the method, each of the aforementioned system elements performs certain steps of the method, as disclosed above in the section referring to the method.

INDUSTRIAL APPLICATION

The present disclosure is used in the field of industry, whenever there are systems including servers and vehicles, where the vehicles are provided with ADAS sensors and where both the server and the vehicles are provided with a machine learning model, and whenever it is needed that the incrementally retrained model be sent over to all the vehicles.

One particular use is in the automotive industry where the vehicles are road vehicles. The corner cases encountered by one of the road vehicles initiate the incrementally retraining of the machine learning model which is then sent over to all the vehicles.

Another particular use is in the field of construction industry where the vehicles are cranes, earth-moving equipment, tractors and the like, all equipped with ADAS sensors. The corner cases encountered by one of the cranes, earth-moving equipment, tractors and the like initiate the incrementally retraining of the machine learning model which is then sent over to all the vehicles.

Another particular use is in the field of robotics where the vehicles are robots equipped with ADAS sensors. The corner cases encountered by one of robots initiate the incrementally retraining of the machine learning model which is then sent over to all the vehicles.

The only difference between the three non-limiting examples of particular uses illustrated above stems in content of the real-world scenery and, correspondingly, the content of the scenarios. However, the content itself is not an object of the present disclosure.

While certain embodiments of the present invention have been described in detail, those familiar with the art to which this invention relates will recognize various alternative designs and embodiments for practicing the invention as defined by the following claims.

The invention claimed is:

1. A continuously adaptive detection computer-implemented method of environment features in autonomous and assisted driving of an ego-vehicle, the ego-vehicle communicatively connected to a server, the server communicatively connected to a plurality of other vehicles, the ego-vehicle, the other vehicles and the server being provided with a machine learning model, the method comprising:
 data collecting, carried out by a data collection and processing unit of the ego-vehicle, comprising:
  acquiring, by ADAS sensors of the ego-vehicle, sensors data from the surroundings of the ego-vehicle,
  interpreting the sensors data, based on the machine learning model, and generating a specific scenario interpretation,
  sending associated instructions to an execution electronic control unit of the ego-vehicle according to the specific scenario interpretation,
  wherein when the specific scenario interpretation is wrong in which there are detected any data inconsistency including at least one of failure in machine learning, coherence checks, high uncertainties, disengagements from a driver, or discrepancies between an expected behavior and an actual behavior of the ego-vehicle, and based on the wrongly interpreted scenario, receiving feedback from the execution electronic control unit by the data collection and processing unit of the ego-vehicle that the specific scenario interpretation is wrong,
  extracting camera images from the acquired sensors data corresponding to the wrong specific scenario interpretation,
  encoding and hashing the camera images corresponding to the wrong specific scenario interpretation to obtain ego-vehicle image hashes, and
  sending the ego-vehicle image hashes corresponding to the wrong specific scenario interpretation to the server together with the acquired sensors data and a request for identifying by the other vehicles specific similar scenarios by the other vehicles;
 data processing, carried out by the server, comprising:
  identifying a specific combination of environment features corresponding to the wrong specific scenario interpretation by the ego-vehicle, and
  broadcasting the ego-vehicle image hashes to the plurality of other vehicles together with a server request that each of the plurality of other vehicles communicates to the server specific similar scenarios by the other vehicles according to the data image hashes received from the ego-vehicle, and other vehicles associated acquired sensors data respective to the other vehicles in similar scenarios,
 data processing, carried out by a data collection and processing unit of a first other vehicle of the other vehicles, comprising:
  receiving the broadcasted ego-vehicle image hashes and the server request from the server,
  acquiring, by ADAS sensors of the first other vehicles, sensors data from the surroundings of the first other vehicle according to the server request,
  processing the acquired sensors data by the first other vehicle including, extracting, encoding and hashing camera images from the acquired sensors data of the first other vehicle to obtain image hashes of the first other vehicle,
  comparing similarity between the image hashes received from the ego-vehicle and the image hashes of the first other vehicles to obtain a similarity score such that a high similarity score, relative to a given threshold, corresponds to similar images, in terms of structure and content, and
  based on the high similarity score, retrieving the acquired sensors data and one or more specific similar scenarios by the first other vehicle corresponding to the image hashes for which the similarity score surpasses the given threshold, and sending to the server the one or more specific similar scenarios by the first other vehicle according to the data image hashes received from the ego-vehicle, and acquired sensors data respective to the first other vehicles similar scenario, data processing, carried out by the server, comprising:
comparing the ego-vehicle sensors data corresponding to the wrong specific scenario interpretation, with the first other vehicle associated acquired sensors data respective to the one or more similar scenarios,
aggregating the acquired sensors data received from the ego-vehicle and the first other vehicles, and using the aggregated sensors data for the incremental retraining of the machine learning model, and
sending to the ego-vehicle the incrementally retrained model,
data processing carried out by the data collection and processing unit of the ego-vehicle, comprising:
updating the machine learning model on the ego-vehicle by replacing the existing machine learning model with the incrementally-retrained machine learning model received from the server.

2. The method according to claim 1, wherein the incrementally retrained machine learning model is sent by the server to the plurality of other vehicles for updating the machine learning model on the other vehicles.

3. The method according to claim 1, wherein the machine learning model is a Convolutional Neural Network.

4. The method according to claim 1, wherein the image encoding, and hashing is performed using one or more visual bag-of-words techniques.

5. The method according to claim 4, wherein the one or more visual bag-of-words techniques comprise binary techniques, including at least one of a Binary Robust Independent Elementary Features (BRIEF) technique or an Oriented and Rotated Binary Robust Independent Elementary Features (ORB) technique.

6. A trained machine learning model, trained in accordance with the method of claim 1.

7. A data-processing system, comprising:
the ego-vehicle,
the server, and
the plurality of other vehicles, where i=2, . . . n,
wherein the data collection and processing unit of the ego-vehicle, the server and the data collection and processing unit of the first other vehicle are configured to carry out the method of claim 1.

8. A plurality of non-transitory computer-readable mediums storing instructions that, when executed by one or more respective processors of the server, of the ego-vehicle and of the first other vehicle causes the respective one or more processors of the server, of the ego-vehicle and of the first other vehicle to perform the method of claim 1.

9. A data processing software product for at least one of autonomous or assisted driving, including instructions maintained in a non-transitory medium which, when executed by one or more processors of a server, cause the one or more processors to perform a method comprising:
receiving, from an ego vehicle to which the server is communicatively coupled, image hashes corresponding to a wrong specific scenario interpretation, sensors data and a request for identifying by other vehicles specific similar scenarios by the other vehicles;
responsive to the receiving, broadcasting to the other vehicles the image hashes and a server request that each of the other vehicles communicates to the server the specific similar scenarios based on the image hashes from the ego vehicle as well as sensors data acquired by the other vehicles in the specific similar scenarios;
receiving, from a first other vehicle of the other vehicles, one or more specific similar scenarios according to the image hashes received from the ego vehicle, and the acquired sensors data corresponding to the first other vehicle;
comparing the sensors data from the ego vehicle with the acquired sensors data corresponding to the first other vehicle;
aggregating the sensors data from the ego vehicle and the acquired sensors data from the first other vehicle to generate aggregated sensors data;
based on the aggregated sensors data, incrementally retraining a machine learning model used by the ego vehicle and the other vehicles to generate a retrained machine learning model; and
sending the retrained machine learning model to the ego vehicles and the other vehicles,
wherein the data processing software product further includes instructions maintained in a second non-transitory medium which, when executed by a processor of the first other vehicle, cause the processor of the first other vehicle to perform a method comprising:
receiving the broadcasted image hashes and server request from the server;
receiving, from ADAS sensors of the first other vehicle, first other vehicle sensors data from surroundings of the first other vehicle based upon the server request, the ADAS sensors including a camera and the first other vehicle sensors data including camera images;
processing the first other vehicle sensors data comprising one or more of extracting, encoding or hashing the camera images of the first other vehicle sensors data to generate hashed image data of the first other vehicle;
comparing a similarity between the image hashes of the ego-vehicle and the hashed image data of the first other vehicle to obtain a similarity score based upon the comparison;
upon an affirmative determination that the similarity score exceeds a predetermined threshold, retrieving the sensors data corresponding to the hashed image data of the first other vehicle as sensors data corresponding to one or more specific similar scenarios; and
sending to the server the first other vehicle sensors data corresponding to the hashed image data of the first other vehicle.

10. The data processing software product of claim 9, wherein the software product further includes instructions maintained in a third non-transitory memory which, when executed by a processor of the ego-vehicle, cause the processor of the ego-vehicle to perform, prior to receiving by the server the image hashes corresponding to the wrong specific scenario interpretation, the sensors data and the request for identifying by other vehicles the specific similar scenarios by the other vehicles:
receiving, from ADAS sensors of the ego-vehicle, the sensors data of the ego-vehicle, the sensors data of the ego-vehicle comprising sensors data of the surroundings of the ego-vehicle;
interpreting the sensors data of the ego-vehicle based upon the machine learning model and generating a specific scenario interpretation;

sending instructions corresponding to the specific scenario interpretation to an execution electronic processor of the ego-vehicle;

determining the specific scenario interpretation as the wrong specific scenario interpretation upon a detection, by the processor of the ego-vehicle, of a data inconsistency associated with at least one of the specific scenario interpretation or execution of the instructions corresponding to the specific scenario interpretation by the execution electronic processor; and extracting camera images from the sensors data of the ego-vehicle corresponding to the wrong specific scenario interpretation;

encoding and hashing the camera images from the sensors data of the ego-vehicle corresponding to the wrong specific scenario interpretation to obtain the image hashes corresponding to the wrong specific scenario interpretation; and sending to the server the image hashes corresponding to the wrong specific scenario interpretation, the sensors data of the ego-vehicle and the request for identifying by other vehicles specific similar scenarios by the other vehicles.

11. The data processing software product of claim 10, wherein the data inconsistency comprises at least one of failure in machine learning, one or more coherence checks, one or more high uncertainties, one or more disengagements from a driver of the ego-vehicle, or one or more discrepancies between an expected behavior and an actual behavior of the ego-vehicle.

12. A data processing software product for at least one of autonomous or assisted driving, including instructions maintained in a non-transitory medium which, when executed by a processor of a first vehicle, cause the processor to perform a method comprising:

receiving broadcasted image hashes and a server request from a server communicatively coupled to the processor of the first vehicle, the server request requesting that each of a plurality of vehicles communicates to the server specific similar scenarios based on the image hashes as well as sensors data acquired by the plurality of vehicles in the specific similar scenarios;

receiving, from ADAS sensors of the first vehicle, first vehicle sensors data from surroundings of the first vehicle based upon the server request, the ADAS sensors including a camera and the first vehicle sensors data including camera images;

processing the first vehicle sensors data comprising one or more of extracting, encoding or hashing the camera images of the first vehicle sensors data to generate hashed image data of the first vehicle;

comparing a similarity between the image hashes received from the server and the hashed image data of the first vehicle to obtain a similarity score based upon the comparison;

upon an affirmative determination that the similarity score exceeds a predetermined threshold, retrieving sensors data corresponding to the hashed image data of the first vehicle as sensors data corresponding to the specific similar scenarios; and sending to the server the first vehicle sensors data corresponding to the hashed image data of the first vehicle.

13. The data processing software product of claim 12, wherein the software product further includes instructions in a second non-transitory memory which, when executed by one or more processors of the server, causes the one or more processors of the server to perform a method comprising:

receiving, from an ego vehicle to which the server is communicatively coupled, the image hashes, the image hashes corresponding to a wrong specific scenario interpretation, sensors data and a request for identifying by vehicles specific similar scenarios by the vehicles; and responsive to the receiving, broadcasting to the vehicles the image hashes and the server request and the sensors data acquired by the vehicles in the specific similar scenarios.

14. The data processing software product of claim 13, wherein instructions in the second non-transitory memory include instructions which, when executed by the one or more processors of the server, causes the one or more processors of the server to further perform:

receiving, from the first vehicle of the other vehicles, the one or more specific similar scenarios according to the image hashes received from the ego vehicle, and the acquired sensors data corresponding to the first vehicle;

comparing the sensors data from the ego vehicle with acquired sensors data corresponding to the first vehicle;

aggregating the sensors data from the ego vehicle and the acquired sensors from the first vehicle to generate aggregated sensors data;

based on the aggregated sensors data, incrementally retraining a machine learning model used by the ego vehicle and the vehicles to generate a retrained machine learning model; and sending the retrained machine learning model to the ego vehicles and the vehicles.

\* \* \* \* \*